(12) United States Patent
Chen

(10) Patent No.: US 8,061,963 B2
(45) Date of Patent: Nov. 22, 2011

(54) GUIDED WIND KITE FOR INCREASED WIND TURBINE POWER OUTPUT

(76) Inventor: Franklin F K Chen, Oakland, CA (US)

( * ) Notice: Subject to any disclaimer, the term of this patent is extended or adjusted under 35 U.S.C. 154(b) by 345 days.

(21) Appl. No.: 12/484,257

(22) Filed: Jun. 15, 2009

(65) Prior Publication Data

US 2010/0260592 A1    Oct. 14, 2010

Related U.S. Application Data

(60) Provisional application No. 61/212,500, filed on Apr. 13, 2009.

(51) Int. Cl.
*F03D 7/00* (2006.01)
(52) U.S. Cl. ............ 415/1; 415/4.3; 415/7; 415/149.2; 415/156; 415/157; 416/1; 416/9; 416/85
(58) Field of Classification Search ............... 415/1, 4.3, 415/4.5, 7, 149.2, 151, 156, 157, 905, 908; 416/1, 9, 85; 290/44, 55
See application file for complete search history.

(56) References Cited

U.S. PATENT DOCUMENTS

| | | | |
|---|---|---|---|
| 3,987,987 A * | 10/1976 | Payne et al. ............ 416/9 |
| 4,045,144 A | 8/1977 | Loth | |
| 4,166,596 A * | 9/1979 | Mouton et al. ............ 415/2.1 |
| 4,204,126 A | 5/1980 | Diggs | |
| 4,222,242 A * | 9/1980 | Moseley ............ 415/914 |
| 4,289,444 A * | 9/1981 | Monk et al. ............ 415/4.2 |
| 4,417,853 A | 11/1983 | Cook | |
| 4,428,711 A * | 1/1984 | Archer ............ 415/2.1 |
| 4,659,940 A * | 4/1987 | Shepard ............ 416/119 |
| 4,872,804 A | 10/1989 | Teles De Menezes | |
| 5,375,968 A | 12/1994 | Kollitz et al. | |
| 5,435,259 A | 7/1995 | Labrador | |
| 5,457,346 A | 10/1995 | Blumberg et al. | |
| 5,484,257 A * | 1/1996 | Osborn ............ 415/2.1 |
| 5,525,037 A | 6/1996 | Cummings | |
| 5,836,738 A * | 11/1998 | Finney ............ 415/60 |
| 6,341,571 B1 | 1/2002 | Russell et al. | |
| 6,382,904 B1 * | 5/2002 | Orlov et al. ............ 415/4.5 |
| 6,523,781 B2 | 2/2003 | Ragner | |
| 6,537,018 B2 | 3/2003 | Streetman | |
| 6,749,393 B2 | 6/2004 | Sosonkina | |
| 6,790,007 B2 | 9/2004 | Gingras et al. | |
| 6,838,782 B2 | 1/2005 | Vu | |
| 6,926,491 B2 | 8/2005 | Migler | |
| 7,131,812 B2 | 11/2006 | Brueckner | |
| 7,215,037 B2 | 5/2007 | Scalzi | |
| 7,220,096 B2 | 5/2007 | Tocher | |
| 7,230,348 B2 | 6/2007 | Poole | |
| 7,275,719 B2 | 10/2007 | Olson | |
| 7,315,093 B2 | 1/2008 | Graham, Sr. | |
| 7,329,965 B2 | 2/2008 | Roberts et al. | |
| 7,484,363 B2 | 2/2009 | Reidy et al. | |
| 7,488,150 B2 | 2/2009 | Krippene | |

* cited by examiner

*Primary Examiner* — Igor Kershteyn
(74) *Attorney, Agent, or Firm* — Perkins Coie LLP; Aaron Wininger

(57) ABSTRACT

A wind turbine system includes a kite positioned upstream to a turbine to direct wind to the turbine, thereby increasing revolutions per minutes and power output of the turbine.

14 Claims, 6 Drawing Sheets

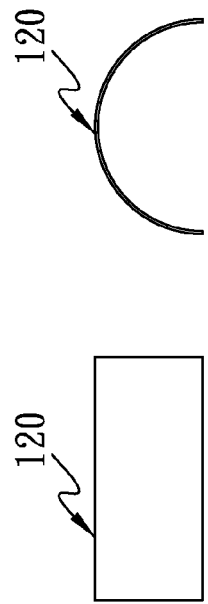
FIG. 2A
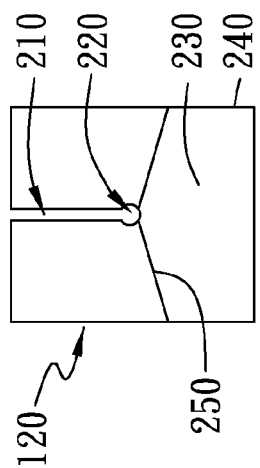
FIG. 2B
FIG. 2C
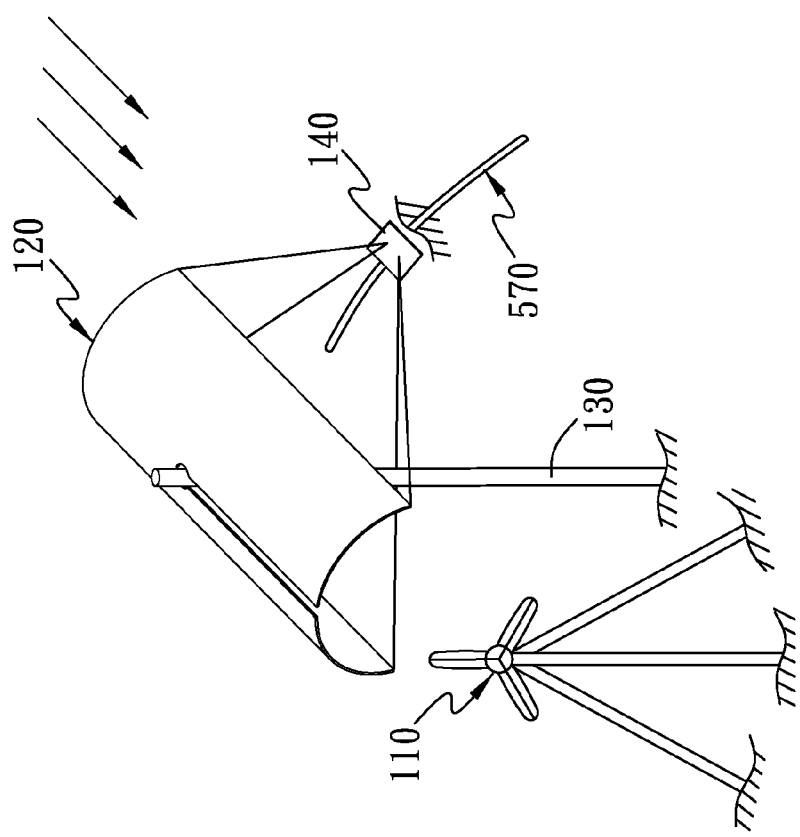
FIG. 1

GUIDED WIND KITE FOR INCREASED WIND TURBINE POWER OUTPUT

CROSS REFERENCE TO RELATED APPLICATION

This application claims priority to and incorporates by reference U.S. patent application Ser. No. 61/212,500 filed Apr. 13, 2009.

TECHNICAL FIELD

This invention relates generally to wind turbines, and more particularly, but not exclusively, provides a kite for directing wind to turbines to increase turbine power output.

BACKGROUND

At the dawn of the clean energy era, wind power is an important element in the harvesting of renewable energy. Wind farms, comprising a plurality of wind turbines, typically use horizontal-axis wind turbines (HAWTs). HAWTs comprise a main rotor shaft and electrical generator positioned on the top of a tower. Most turbines are three bladed and rotate into the wind. The towers range from about 200-300 feet in height while the blades vary in length from about 65-130 feet. A gearbox step ups the speed of the generator from about 30-60 rotations per minute (RPM) at the blades to about 1000-1800 RPM in a generator gear shaft.

Most wind turbines need a minimum wind speed of 10 miles per hour (MPH) and an optimum wind speed of about 30 MPH. However, as winds can be low and/or variable, a new system and method are needed to increase wind speed at the turbine to meet minimal and optimal wind speed requirements.

SUMMARY

Embodiments of the invention increase the wind turbine power output by increasing the volume of airflow directed at a turbine impellor. In model tests, model axial flow turbine speed (without load) was measured. Operation with an embodiment of the invention yielded significantly higher turbine speed. In some tests, a twofold increase in speed was measured. For new turbine construction, embodiments also allow for a lower placement of the turbine by scooping and directing air stream to the lower placed turbine. The advantage of a lower placed turbine is the cost difference between the support structure for wind turbine and that for the wind kite, estimated to be in favor of the wind kite support structure. Less tangible is the esthetics of hundreds of multi colored wind kites flying over the turbines like spring poppies covering a wide swap of the wind farm.

In an embodiment, a system comprises a wind turbine and a kite positioned adjacent the wind turbine to funnel wind to the turbine. The kite can have an approximate shape of a half funnel or of a half pipe. The system may also comprise a kite support pole coupled to the kite at a collar located approximately in a center of the kite. The system may also comprise a kite control platform mounted on ground in front of and upstream of the wind turbine and coupled to the kite for controlling positioning of the kite. The platform may include spools of guy wire that are coupled to approximate corners of the kite. The system may further comprise a guide rail system that positions the kite control platform.

In an embodiment, the kite comprises: a frame; a weatherproof membrane mounted within the frame; a channel extending from an edge of the kite to an approximate center of the kite; a circular collar at end of the channel at the approximate center of the kite; and connection hooks at approximate corners of the kite for connecting to guy wires.

In an embodiment, a method comprises: positioning a kite adjacent a wind turbine to funnel wind to the turbine; and generating electricity with the turbine. In an embodiment, the method further comprises: controlling the kite based on current wind conditions with the kite control platform.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 illustrates an embodiment of invention in operation in conjunction with a wind turbine;

FIG. 2A illustrates a side view of the wind kite of FIG. 1;
FIG. 2B illustrates a end view of a wind kite of FIG. 1;
FIG. 2C illustrates a bottom view of a wind kite of FIG. 1.

DETAILED DESCRIPTION OF THE ILLUSTRATED EMBODIMENTS

Figure 4:
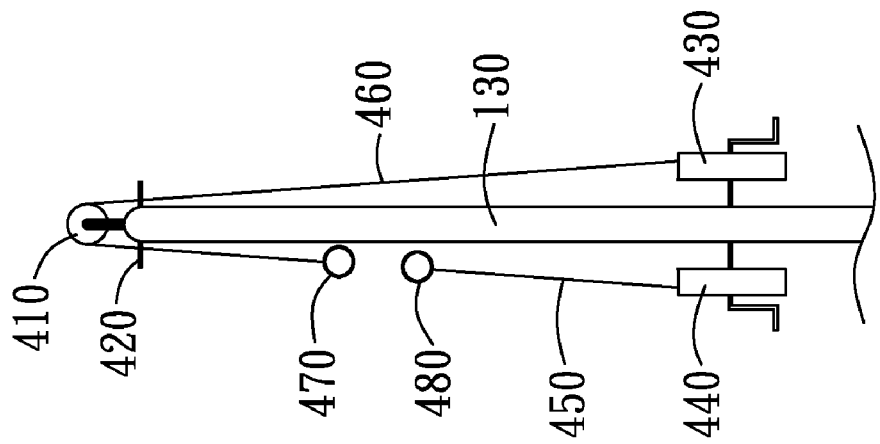
FIG. 4 illustrates a kite support pole with spools to raise or lower the wind kite.

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

FIG. 1 illustrates an embodiment of invention in operation in conjunction with a wind turbine 110. The embodiment includes an apparatus for improving wind turbine operation comprising: a wind kite 120 with the approximate geometry of a half pipe or that of a half conic; a kite support pole 130 vertically mounted on ground in front of and upstream to the wind turbine 110 assuming predominant wind direction; a kite control platform 140 of spools of guy wire which are connected to the wind kite 120; and a guide rail 570 mounted on ground upstream of the kite support pole 130 for positioning of the kite control platform 140 along this guide rail 570. In other embodiments, a guide rail system of multiple rails may substitute for the single guide rail 570.

Figure 8B:
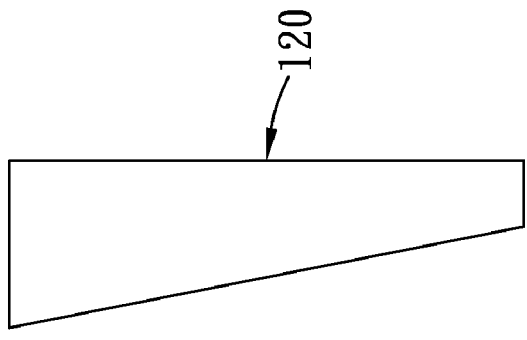
FIG. 8B illustrates a side view of a half cone shaped wind kite.
Figure 8A:
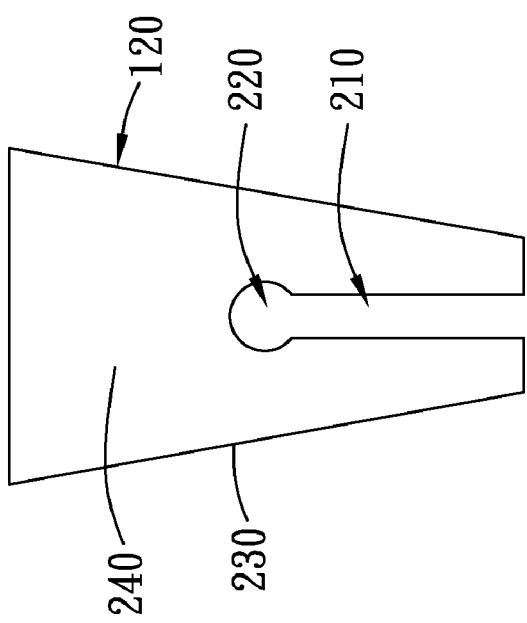
FIG. 8A illustrates a top view of a half cone shaped wind kite.
Figure 8C:
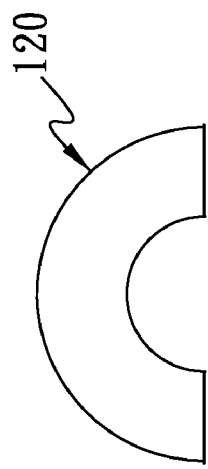
FIG. 8C illustrates a end view of a half cone shaped wind kite.

Referring to FIGS. 2A, 2B and 2C, an embodiment of the wind kite 120 has the approximate shape of a half pipe. In another embodiment, referring to FIGS. 8A, 8B and 8C, the wind kite 120 has the approximate shape of a half funnel. The width of the wind kite 120 is approximately the diameter of the turbine impellor in one embodiment. The length of the wind kite 120 is approximately twice the width of the wind kite 120. The size of the wind kite 120 can vary greatly depending on the installation site geometry.

The kite 120 is comprised of a frame 240 and a weather proof membrane 230 mounted within the frame. The kite frame 240 is semi-rigid with inner frame 250 in an embodiment, and can flex slightly in strong wind operating conditions. The kite frame 240 has connection hooks or similar for connecting to the kite control guy wires. The kite frame 240 is made of light weight alloy tubing, fiber composite pole, other plastic material or combination of these. The kite membrane 230 is made of fabric material used in sail and/or tent construction.

Figure 3:
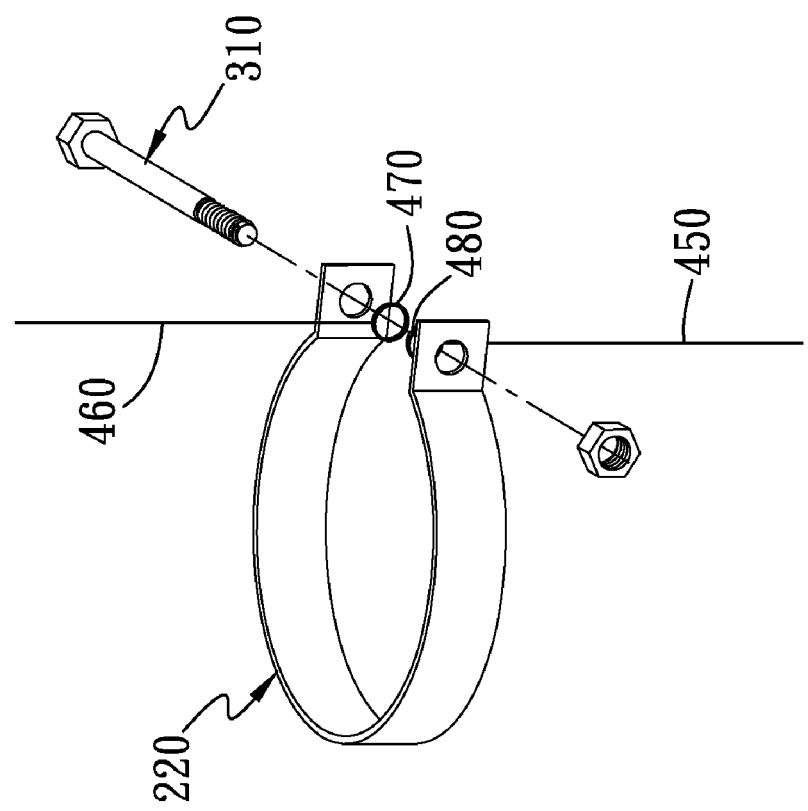
FIG. 3 illustrates a wind kite collar in connection to top and bottom raiser rings.

The kite 120 has a channel 210 in the middle of the kite extending from an edge of the kite 120 to the approximate center of the kite 120 in an embodiment. The channel 210 has several hooks or similar devices or mix of devices along the length of the channel 210 for fastening the two sides of the channel together. At the end of the channel 210, the channel becomes a circular collar 220. The channel 210 and the collar 220 are sized to allow the kite 120 to be placed around the kite support pole 130. The diameter of the collar is sufficiently sized to allow the wind kite 120 to pitch and yaw around the kite support pole 130. Other collar designs, such as gimbals joints, are adapted in other embodiments. Referring to FIG. 3, the kite is fastened using the collar 220 as a loop around the kite support pole 130 and connected to a top raiser ring 470 and a bottom raiser ring 480, by a bolt and nut 310 or other fastening mechanism.

Referring to FIG. 4, the kite support pole 130 is mounted vertically to the ground upstream of the turbine in the predominant wind direction. The kite support pole 130 is a metal pipe or similar. The height of the kite support pole 130 is approximately the height of the wind turbine 110 plus the length of the turbine impellor. The distance between the kite support pole 130 and the wind turbine 110 is approximately half of the length of the wind kite 120, so as the wind kite 120 in operation could never come into physical contact with the turbine or interfere with the operation of surrounding wind turbines. At the top of the kite support pole 130, pulley 410 is mounted where the top raiser guy wire 460 can securely pass and change direction from upward to downward. Below the pulley 410 is the stopper plate 420 to prevent the wind kite collar from going beyond the top of the kite support pole 130, thereby limits the maximum operating height of the wind kite 120. At the end of the top raiser guy wire 460, a top raiser ring 470 is attached for connection with the kite collar 220. At the opposite end of the top raiser guy wire 460, the wire is spooled onto a top raiser spool 430, which is mounted on the kite support pole near ground or on a nearby location. Next to the top raiser spool 430 is mounted the bottom raiser spool 440. The bottom raiser spool 440 spools the bottom raiser guy wire 450. The end of the bottom raiser guy wire 450 is attached to the bottom raiser ring 480, which is connected to the kite collar 220 when in operation.

Figure 5:
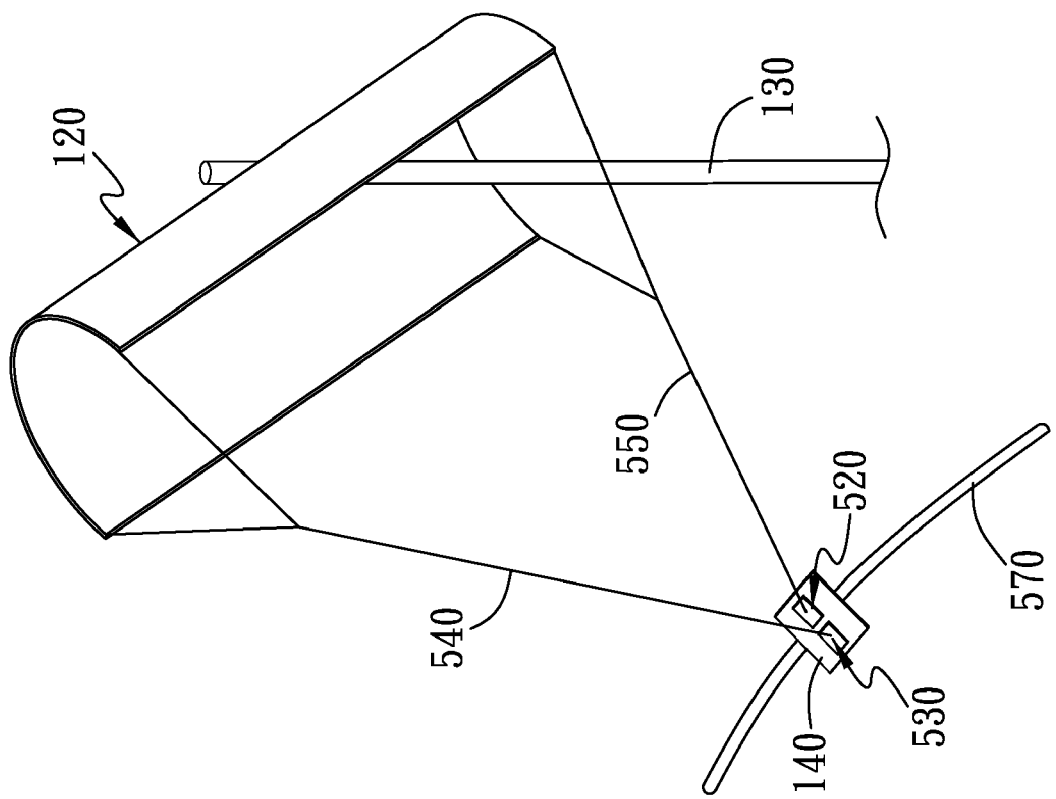
FIG. 5 illustrates a kite control platform and guide rail in relationship to the wind kite.
Figure 6B:
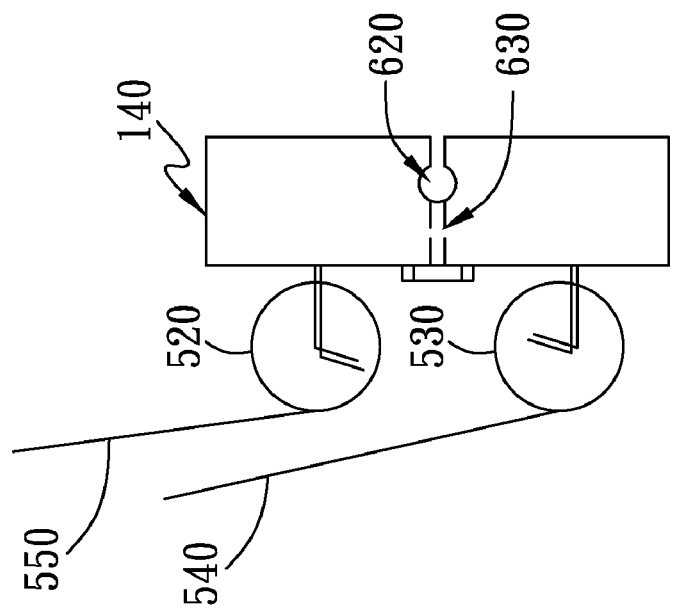
FIG. 6B illustrates a side view of a kite control platform of FIG. 5.
Figure 6A:
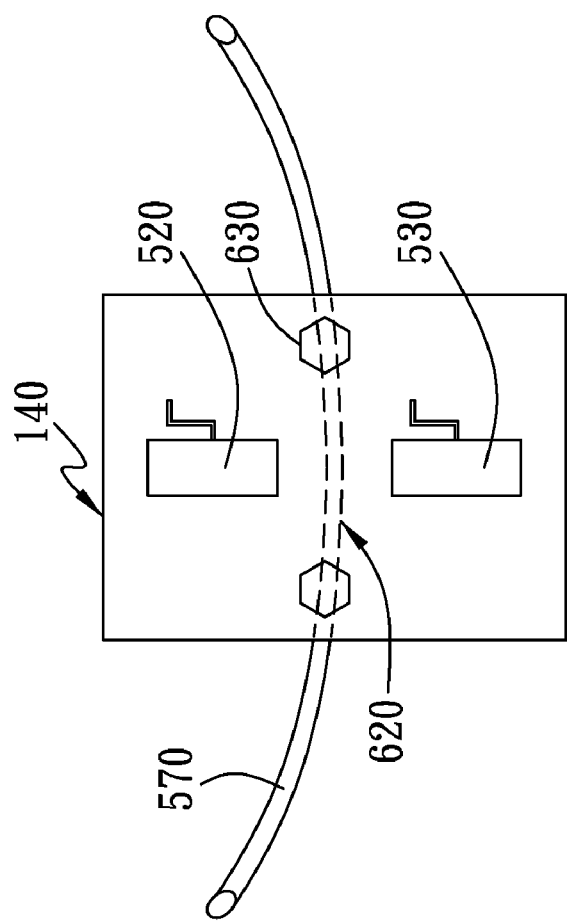
FIG. 6A illustrates a top view of a kite control platform of FIG. 5.
Figure 7B:
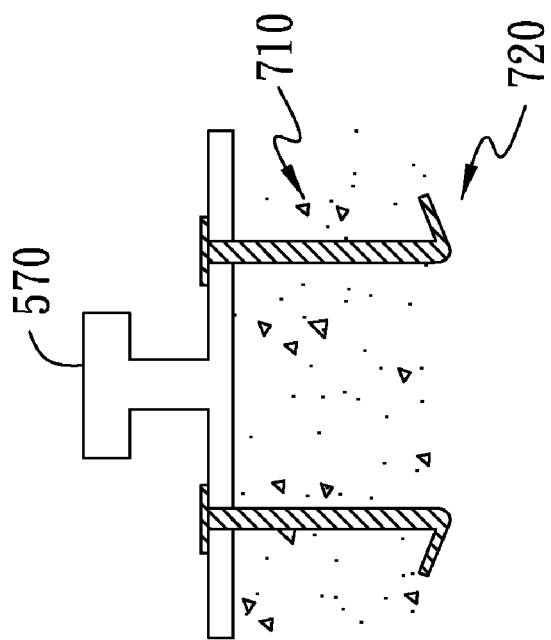
FIG. 7B illustrates a cross section of a T guide rail.
Figure 7A:
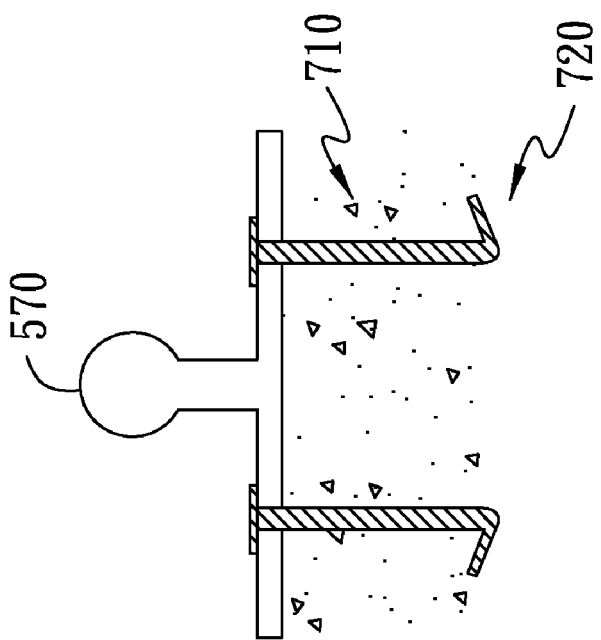
FIG. 7A illustrates a cross section of a round guide rail.

Referring to FIG. 5 and FIG. 6, a guide rail 570 is mounted on a concrete foundation 710 (FIGS. 7A and 7B). Moveably mounted onto the guide rail 570 is a kite control platform 140. Once in position, the kite control platform 140 is locked into position by bolt 630 or similar mechanism. On top of the kite control platform, 2 to 4 kite control spools (520 and 530 of FIG. 6A) are mounted. FIG. 5 shows the 2 spools embodiment. These spools spool the kite control guy wires that are connected to the wind kite 120; the top guy wire 540 is connected to the top of the kite 120 or thereabout and the bottom guy wire 550 is connected to the bottom of the kite 120 or thereabout.

For the 2+ spools embodiment, 2 of the spools spool the 2 guy wires connected to the top of the kite 120 and the other remaining spool(s) spools the kite control guy wire connected to the bottom of the wind kite 120 or thereabout. On the bottom of the kite control platform 140 is a channel 620, securely but moveably fitted over the guide rail 570. The guide rail system can be a single track or be comprised of multiple tracks. The guide rail geometry can also be different, shown as a round pipe in FIG. 7A and a T beam in FIG. 7B. Other shapes are possible. FIGS. 6A and 6B illustrate the single track round rail embodiment of the invention. Multiple rails are possible in other embodiments. The guide rail 570 is mounted on a concrete foundation 710 with anchor bolts 720.

Depending on the installation site, the guide rail 570 can be an arc of many feet in each direction, or a single point when wind direction is constant and/or when space is limited. In this situation, the kite control platform 140 is mounted directly on the concrete foundation 710 without the guide rail 570. In a different embodiment, the guide rail 570 is replaced by several smaller platforms mounted at discrete locations approximately representing the 4 corners of the wind kite 120 obliquely projected onto the ground upstream of the kite support pole 130. Each smaller platform has a spool of kite control guy wire connected to the individual corner of the wind kite 120. All of the spools are bidirectional and can be locked in place at desired positions. All structure, guide wire, spool, kite frame, kite fabric and foundation are designed and fabricated with material and of adequate size for the most severe weather condition on the installation site.

Before operation, the kite control platform 140 is positioned on the guide rail 570 to align with the kite support pole 130 in the predominant wind direction and locked into this position. The top guy wire 540 is securely connected to the top of the wind kite 120, and the bottom guy wire 550 is securely connected to the bottom of the wind kite.

The wind kite 120 is slipped around the kite support pole 130 through the kite channel 210. When the kite collar 220 is in position with the kite support pole 130, the collar 220 is closed by bolt/nut 310 or similar, and securely connected to both the top raiser ring 470 and the bottom raiser ring 480. The kite channel 210 is fastened closed at multiple locations along the channel 210.

With adequate lengths of kite control guy wires 540 and 550 un-spooled, the kite is raised by simultaneously spooling the top raiser spool 430 and un-spooling the bottom raiser spool 440. At operating height (usually at top of the kite support pole 130), both top raiser spool 430 and the bottom raiser spool 440 are locked securely in these position, maintaining a taut top raiser guy wire 460 and a taut bottom raiser guy wire 450.

The top kite control spool 530 and the bottom kite control spool 520 are spooled to affect an operating angle for the wind kite 120. This can be at 45 degree from vertical. This operating angle can vary greatly depending on the site conditions. For the 2+ control spools embodiment, the yaw angle of the wind kite 120 is set by a different length for the left and right control guy wires. With sufficient operating data, analysis can be performed to formulate a best practice table for kite operation under different site conditions.

In advanced operation, the turbine power, wind velocity, direction, height, and spool positions are measured. These measurements are collected and analyzed for optimal operation to achieve best turbine parameters by a SCADA (Supervisory Control And Data Acquisition) system or similar. With these measurements and additional equipment such as servo controlled spools, direct digital control (DDC) or predictive control for best power output under changing conditions can be achieved in real time.

The foregoing description of the illustrated embodiments of the present invention is by way of example only, and other variations and modifications of the above-described embodiments and methods are possible in light of the foregoing teaching. The embodiments described herein are not intended to be exhaustive or limiting. The present invention is limited only by the following claims.

What is claimed is:

1. A wind turbine system, comprising:
a wind turbine;
a kite positioned adjacent the wind turbine to funnel wind to the turbine, the kite comprising
a frame;
a weatherproof membrane mounted within the frame;
a channel extending from an edge of the kite to an approximate center of the kite;
a circular collar at end of the channel at the approximate center of the kite; and
connection hooks at approximate corners of the kite for connecting to guy wires.

2. The system of claim 1, wherein the kite has an approximate shape of a half funnel.

3. The system of claim 1, wherein the kite has an approximate shape of a half pipe.

4. The system of claim 1, further comprising a kite support pole coupled to the kite at a collar located approximately in a center of the kite.

5. The system of claim 4, further comprising a kite control platform for controlling the kite based on current wind conditions mounted on ground in front of and upstream of the wind turbine and coupled to the kite for controlling positioning of the kite.

6. The system of claim 5, wherein the platform includes spools of guy wire that are coupled to approximate corners of the kite.

7. The system of claim 5, further comprising a guide rail system that positions the kite control platform.

8. A method, comprising:
positioning a kite adjacent a wind turbine to funnel wind to the turbine; and
generating electricity with the turbine,
wherein the kite comprises
a frame;
a weatherproof membrane mounted within the frame;
a channel extending from an edge of the kite to an approximate center of the kite;
a circular collar at end of the channel at the approximate center of the kite; and
connection hooks at approximate corners of the kite for connecting to guy wires.

9. The method of claim 8, wherein the kite has an approximate shape of a half funnel.

10. The method of claim 8, wherein the kite has an approximate shape of a half pipe.

11. The method of claim 8, further comprising support the kite with a kite support pole coupled to the kite at a collar located approximately in a center of the kite.

12. The method of claim 11, further comprising controlling the kite based on current wind conditions with a kite control platform coupled to the kite and mounted on ground in front of and upstream of the wind turbine.

13. The method of claim 12, wherein the platform includes spools of guy wire that are coupled to approximate corners of the kite.

14. The method of claim 12, further comprising guiding the kite control platform with a guide rail system.

* * * * *